United States Patent [19]

Ratcliffe et al.

[11] 4,071,606
[45] Jan. 31, 1978

[54] SULFUR DIOXIDE WITH COAL

[75] Inventors: Charles T. Ratcliffe, Denville; Geza Pap, Morristown, both of N.J.

[73] Assignee: Allied Chemical Corporation, Morris Township, N.J.

[21] Appl. No.: 750,044

[22] Filed: Dec. 13, 1976

[51] Int. Cl.² ............................................. C01B 17/04
[52] U.S. Cl. ...................................... 423/569; 48/210; 48/DIG. 4
[58] Field of Search ................... 423/569, 570; 201/8, 201/9; 48/197 R, 210, DIG. 4

[56] References Cited

U.S. PATENT DOCUMENTS

| 1,917,685 | 7/1933 | Bacon et al. | 423/569 |
| 1,954,351 | 4/1934 | Dornbrook | 201/9 |
| 2,002,860 | 5/1935 | Levy | 423/569 |
| 2,884,303 | 4/1959 | Metrailer | 48/DIG. 4 |
| 3,932,146 | 1/1976 | Wilson et al. | 48/210 |

FOREIGN PATENT DOCUMENTS

| 196,604 | 9/1904 | Germany | 423/569 |

*Primary Examiner*—G. O. Peters
*Attorney, Agent, or Firm*—Anthony J. Stewart; Gerard P. Rooney

[57] ABSTRACT

A process is described for producing sulfur by the reaction of sulfur dioxide with agglomerating coal. The purity of the product gases is improved and the tendency of the coal to agglomerate is reduced by employing coal particles having a particle size below 500 microns.

2 Claims, No Drawings

SULFUR DIOXIDE WITH COAL

BACKGROUND

This invention relates to a process for producing sulfur from sulfur dioxide. More particularly, this invention relates to a process for producing sulfur by reaction of sulfur dioxide with agglomerating coal.

There is a great many processes known for removing sulfur dioxide from gases. It is important that sulfur dioxide be removed from gases exiting industrial plants since sulfur dioxide is an environmental pollutant. It is equally important to remove the sulfur dioxide from these gases due to the fact that the emission of sulfur dioxide to the atmosphere results in a loss of sulfur values since sulfur dioxide can be converted to sulfur. Many of the processes practiced commercially involve the use of reducing agents suth as natural gas or other gaseous reductants. It is also known that the sulfur dioxide in gases can be reduced by reaction with coal. The use of coal to reduce sulfur dioxide is attractive due to the expense and possible shortage of gaseous reductants. Coal is one of the most abundant fossil fuels and, in relation to other reductants for sulfur dioxide, is relatively inexpensive.

A process for the reduction of sulfur dioxide to sulfur employing coal is described in British Pat. No. 1,390,694. In the process described sulfur dioxide containing gases are introduced into a moving bed of particulate coal and reduced to elemental sulfur and/or hydrogen sulfide. For industrial application of this type of technology it is important that the coal used in such a process originates from deposits located short distances from the plant at which such a process is practiced. Coal occurs in many forms, some of which are "caking," or "agglomerating" coals and others which are non-caking or non-agglomerating coals. In employing the process of the British patent, it would obviously be important that the coal be non-agglomerating or non-caking since the moving bed of coal particles could be seriously affected by the type of coal employed. For example, if agglomerating coals were employed at the temperatures required in the process described, the coal particles would tend to stick to each other forming large lumps and rendering the process inoperative causing equipment breakdown. However, if, for example, the power plant, employing coal to reduce the sulfur dioxide content of the off-gases is located nearby a coal deposit which produced agglomerating coals, it would be very desirable to develop a process in which agglomerating coals could be employed for the reduction of the sulfur dioxide contents of the gases.

It is an object of this invention to provide a method for the efficient reduction of sulfur dioxide to sulfur using agglomerating coals as a reductant. This and other objects will become apparent from the description which follows.

SUMMARY OF THE INVENTION

Briefly, in accordance with this invention, there is provided an improved process for producing sulfur by the reduction of sulfur dioxide with an agglomerating coal wherein sulfur dioxide is passed into a bed of particles of the coal, heated to a temperature of between 600 and 900° C, and sulfur is recovered from the product gases leaving the bed. The improvement comprises reducing the tendency of the coal particles to agglomerate and reducing the amount of tar in the product gases by employing only coal particles having a particle size less than 500 microns.

Surprisingly, it has been discovered that the use of small particle size coal, i.e., below 500 microns, which would be expected to increase the agglomeration problem, in fact results in just the opposite effect, i.e., the agglomerating tendency of the coal particles is reduced. Additionally, the use of small particle size coal gives the added beneficial result of substantially improving the purity of the product sulfur when aggomerating coals are used as a reductant for sulfur dioxide.

Agglomerating coals are generally bituminous coals which have a high volatile content, i.e., a relatively high content of components which volatilize upon heating. It is believed that the tendency of these coals to agglomerate, or cake, is based on the content of the volatiles which, upon heating, form a liquid coating on the surface of particles of the coal. When a coal particle having such a coating comes in contact with another coal particle similarly treated, the liquid face causes sticking or agglomeration. When the coal particles are used to reduce sulfur dioxide and agglomeration occurs, it is also believed that the presence of the high volatile content in the coals results in off-gases containing more than an acceptable amount of tar which contaminates the product sulfur. Thus, when agglomerating coal particles are used as a reductant for sulfur dioxide, it would seem logical that the greater the surface area in the bed of coal particles, the greater would be the tendency of the coal to agglomerate and the greater would be the expectation of additional amounts of contaminants in the offgases. However, it has been found that this is not the case and when the particles of agglomerating coal used to reduced sulfur dioxide are sized below 500 microns (i.e., will pass through a 40 mesh, (U.S. standard screen) the particles do not agglomerate, the purity of the product gases is greatly increased and the process runs very smoothly.

The reaction between sulfur dioxide and the particles of agglomerating coal as described herein can be carried out in a static bed, a moving bed or under fluidized bed conditions. In all these situations, however, it has been found necessary to employ coal particles having a particle size below 500 microns as described.

Reaction of sulfur dioxide with bituminous agglomerating coals is carried out at a temperature of between 600° and 1000° C, preferably between 750° and 850° C. At higher temperatures the probability of introducing contaminants into the off-gases, and thus the product sulfur, is greatly increased and at temperatures below about 600° C, the ability of the coal to react is greatly reduced, resulting in inefficient operation.

The source of the sulfur dioxide containing gas introduced into the bed of particulate agglomerating coal particles is not an essential part of the present invention. Stack gases contain sulfur dioxide are generally treated to concentrate the sulfur dioxide before a reduction process is instituted. While it is possible to use gases containing relatively low concentrations of sulfur dioxide, such would not be as efficient as the use of higher concentrations, and, for this reason it is preferred to employ a sulfur dioxide containing gas having a concentration above about 25 percent by volume, more preferably, above 50 percent and most preferably above 85 percent sulfur dioxide in carrying out the process of this invention.

The process of this invention is advantageously carried out continuously. When so operating, it will be necessary to provide means for adding additional coal, and, if desired, removing the ash resulting from the reaction of sulfur dioxide with the coal. This may be done by known means.

DESCRIPTION OF PREFERRED EMBODIMENTS

A series of reactions were carried out in which coal samples were first containd in a ½ inch quartz tube approximately 50 centimeters in length. A concentric micro-tube furnace of 3 inches in length was mounted on a linear drive train in such a manner as to move the furnace over the coal containing quartz tube at a steady rate. A gas flow of sulfur dioxide and nitrogen was metered through the bed of coal contained in the reactor tube with the oven held at the indicated temperature and moving in the opposite direction of the gas flow. This apparatus was designed to equate with a co-current gas-solid reactor and to allow for more precise control of reaction variables.

Samples of HVC bituminous agglomerating coal from Indiana and Illinois were screened to give the indicated particle size. The Indiana coal (#5 seam) analyzed 15.14% moisture; 11.9% ash; 35.2% volatiles; 37.6% fixed carbon and 2.83% sulfur and had a BTU value of 10,345. The Illinois coal analyzed 16.46% moisture; 12.46% ash; 31.62% volatiles; 39.46% fixed carbon and 3.08% sulfur and had a BTU value of 10,020. The conversion of the sulfur dioxide in the gas stream was measured at 15 minute intervals during each run and the relative tar formation and quality of the product sulfur was observed. After each run the ash-char mixture was removed and tested for agglomeration. As shown in the Table, the rate of $SO_2$ conversion, quality of sulfur, and lack of agglomeration of tar formation were all high with the smaller particle coal samples.

| Run No. | Coal Source | Particle Size in Microns | Gas Flow in cc per minute | | Gas Contact Time | Temperature | $SO_2$ conversion (mol %) | Tar Formation | Product Sulfur | Nature of Ash-Char |
| --- | --- | --- | --- | --- | --- | --- | --- | --- | --- | --- |
| | | | $N_2$ | $SO_2$ | | | | | | |
| 1 | Illinois | 250 to 425 | 23 | 84 | 0.32 sec. | 850° C | 100 | low | clean | free flow |
| 2 | Illinois | 250 to 425 | 30 | 150 | 0.19 sec. | 850° C | 91 | low | clean | free flow |
| 3 | Illinois | 250 to 425 | 25 | 145 | 0.20 sec. | 850° C | 98 | low | clean | free flow |
| 4 | Illinois | 2000 to 4000 | 20 | 70 | 0.38 sec. | 850° C | 60 | high | black | agglomerated |
| 5 | Indiana | 250 to 425 | 25 | 125 | 0.23 sec. | 850° C | 97 | low | clean | free flow |
| 6 | Illinois | 250 to 425 | 15 | 85 | 0.34 sec. | 750° C | 85 | low | clean | free flow |
| 7 | Indiana | 2000 to 4000 | 20 | 10 | 1.14 sec. | 850° C | 42 | very high | tarry | agglomerated plug |
| 8 | Indiana | 75 to 150 | 25 | 85 | 0.31 sec. | 850° C | 98 | low | clean | free flow |

We claim:

1. In a process for producing sulfur by the reduction of sulfur dioxide with an agglomerating coal wherein a sulfur dioxide containing gas is passed into a bed of particles of the coal heated to a temperature of between 600° and 900° C and sulfur is recovered from the product gases leaving the bed, the improvement which comprises reducing the amount of tar in the product gases and reducing the tendency of the coal particles to agglomerate by employing coal particles having a particle size less than 500 microns.

2. The process of claim 1 wherein the sulfur dioxide content of the gas is above 50 percent by volume.

* * * * *

UNITED STATES PATENT OFFICE
CERTIFICATE OF CORRECTION

Patent No. 4,071,606  Dated January 31, 1978

Inventor(s) Charles T. Ratcliffe et al.

It is certified that error appears in the above-identified patent and that said Letters Patent are hereby corrected as shown below:

In the title, "SULFUR DIOXIDE WITH COAL" should read

-- REDUCTION OF SULFUR DIOXIDE WITH COAL --.

Signed and Sealed this

Eighteenth Day of July 1978

[SEAL]

Attest:

RUTH C. MASON
Attesting Officer

DONALD W. BANNER
Commissioner of Patents and Trademarks